US010682537B2

(12) United States Patent
Lackore, Jr.

(10) Patent No.: US 10,682,537 B2
(45) Date of Patent: Jun. 16, 2020

(54) ERGONOMIC SCBA HOLDER

(71) Applicant: Spartan Fire, LLC, Carson City, NV (US)

(72) Inventor: James Roger Lackore, Jr., Big Bend, WI (US)

(73) Assignee: Spartan Fire, LLC, Carson City, NV (US)

( * ) Notice: Subject to any disclaimer, the term of this patent is extended or adjusted under 35 U.S.C. 154(b) by 0 days.

(21) Appl. No.: 15/954,390

(22) Filed: Apr. 16, 2018

(65) Prior Publication Data

US 2019/0314654 A1   Oct. 17, 2019

(51) Int. Cl.
| | |
|---|---|
| A62B 25/00 | (2006.01) |
| B62D 33/06 | (2006.01) |
| A62C 27/00 | (2006.01) |
| B60R 7/08 | (2006.01) |
| B60R 7/02 | (2006.01) |

(52) U.S. Cl.
CPC .............. *A62B 25/00* (2013.01); *A62C 27/00* (2013.01); *B60R 7/02* (2013.01); *B60R 7/08* (2013.01); *B62D 33/06* (2013.01)

(58) Field of Classification Search
CPC ................................ A62C 13/78; A62B 25/00
See application file for complete search history.

(56) References Cited

U.S. PATENT DOCUMENTS

| | | | |
|---|---|---|---|
| 3,490,727 A | 1/1970 | Miller | |
| 3,667,714 A | 6/1972 | Ziaylek, Jr. | |
| 3,780,972 A | 12/1973 | Brodersen | |
| 4,021,070 A | 5/1977 | Shea | |
| 4,056,017 A * | 11/1977 | Cobb | A62B 9/04 74/522 |
| 5,104,280 A * | 4/1992 | Ziaylek | B60R 9/0423 280/4 |
| 5,209,628 A * | 5/1993 | Hassell | B60P 1/4442 224/282 |

(Continued)

OTHER PUBLICATIONS

Departments Embrace Clean Cab Concept for Fire Apparatus, Fire Apparatus and Emergency Equipment, Jan. 27, 2018, available at https://www.fireapparatusmagazine.com/articles/print/volume-23/issue-1/departments/special-delivery/two-florida-departments-implement-clean-cab-concept.html#gref (Year: 2018).*

(Continued)

*Primary Examiner* — Mark C Hageman
(74) *Attorney, Agent, or Firm* — Michael Best & Friedrich LLP

(57) ABSTRACT

Embodiments of a storage compartment for self-contained breathing apparatuses (SCBA) are provided. The storage compartment includes a deployment mechanism to facilitate efficient and ergonomic donning of the SCBA. Advantageously, the storage compartment is closed off from the cabin of a firetruck and is accessed from the exterior of the firetruck so that any chemicals that off-gas from the SCBA are contained in their own compartment separate from the interior of the firetruck's cabin. The SCBA are able to be deployed from the storage compartment in a variety of different ways. Each embodiment of the deployment mechanism is configured to deploy the SCBA from an elevated position within the storage compartment to an exterior position that is roughly at the level of a firefighter's back.

13 Claims, 14 Drawing Sheets

(56) References Cited

U.S. PATENT DOCUMENTS

| | | | |
|---|---|---|---|
| 6,086,312 | A | 7/2000 | Ziaylek et al. |
| 6,638,000 | B2 * | 10/2003 | Groves .................. B60R 9/042 224/321 |
| 7,621,565 | B2 | 11/2009 | Ross, Jr. et al. |
| 7,976,090 | B2 | 7/2011 | Sandness et al. |
| 8,469,247 | B2 | 6/2013 | Nicoletti |
| 8,616,383 | B1 * | 12/2013 | Miller .................... B68C 1/002 211/1.51 |
| 8,985,933 | B2 * | 3/2015 | Ziaylek ................ B60R 9/0423 182/127 |
| 10,124,852 | B2 * | 11/2018 | Potticary ................ B60R 11/00 |

OTHER PUBLICATIONS

Zico Quic-Swing SCBA Holders Parts and Information Bulletin, https://www.ziamatic.com/wp-content/uploads/1020pm1.pdf. (Year: 2011).*

Zico basic swing down website, Jul. 2016, https://web.archive.org/web/20160714002636/http://www.ziamatic.com:80/product/basic-swing-down-unit/. (Year: 2016).*

Pierce Manufacturing Facebook Video from FDIC, May 3, 2017, https://www.facebook.com/Pierce/videos/york-county-va-enforcer-non-walk-in-heavy-duty-rescue/10158540438225527/. (Year: 2017).*

Zimatic Price List, from https://authorzilla.com/Y1dDZ/list-price-list-ziamatic-corp.html, dated Nov. 17, 2016 (Year: 2016).*

Prior Art in the field of Business Method Patents, (Year: 2002).*

* cited by examiner

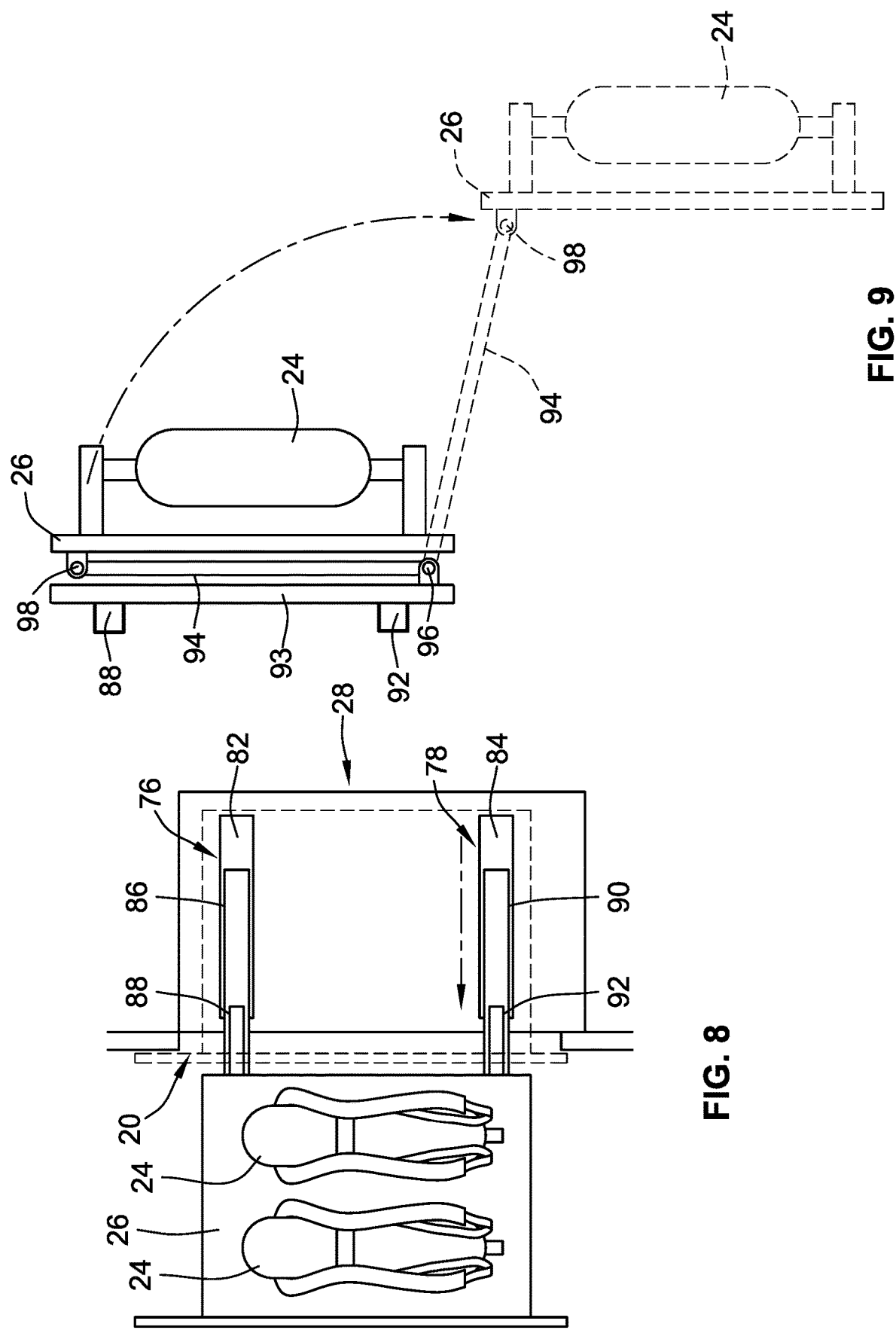

ERGONOMIC SCBA HOLDER

FIELD OF THE INVENTION

This invention generally relates to a holder for a self-contained breathing apparatus and a method of storing/accessing same. More particularly, this invention relates to a compartment in the cab of an emergency service vehicle for storing a self-contained breathing apparatus and methods of utilizing same.

BACKGROUND OF THE INVENTION

Emergency vehicles, such as firetrucks, are designed to respond efficiently to emergency situations, such as fires. Thus, in many conventional firetrucks, for example, the occupant cabin includes seats having cavities formed therein for a tank of a self-contained breathing apparatus (SCBA). In this way, a firefighter can wear the tank when responding to an emergency, which reduces the donning time at the scene. However, given the modification of the seats for storing SCBA, generally no further storage is provided for the SCBA after returning from a call. As such, a firefighter will typically store the SCBA in the seat in the firetruck cabin.

Nowadays, fires in modern structures typically involve more than just burning wood, plaster, and natural fibers. Often, plastic and other synthetic structures as well as materials coated or treated with a variety of chemicals are contained in modern structures, and during a fire, the combustion of these materials releases a variety of chemicals into the air. During the fire, the firefighter's personal protective equipment and SCBA prevent the firefighter from coming into contact or breathing such potentially harmful chemicals, but the chemicals may deposit on the firefighter's personal protective equipment and SCBA.

However, after returning from a fire, firefighters may be at an increased risk of coming into contact or breathing these chemicals because the SCBA are often stored in the cabin of the firetruck. In particular, after a fire, chemicals that may have deposited on the SCBA may off-gas in the cabin while firefighters riding therein are not wearing any protective gear. Therefore, a need exists in the art for a way to safely store SCBA in a manner that isolates the contaminated SCBA from the occupant space but also provides for convenient and efficient access to the SCBA at the scene of a fire and storage of the SCBA when leaving the scene of a fire.

Embodiments of the present disclosure provide such storage devices and methods for SCBA. These and other advantages of the invention, as well as additional inventive features, will be apparent from the description of the invention provided herein.

BRIEF SUMMARY OF THE INVENTION

In the present disclosure, embodiments of a storage compartment for self-contained breathing apparatuses (SCBA) are provided. In particular, the storage compartment is configured for use on an emergency vehicle, specifically a firetruck. As highlighted in the previous section, fires in modern structures often produce potentially harmful chemicals that settle on a firefighter's personal protective gear, including the firefighter's SCBA. Because SCBA are often stored in the cabin of the firetruck, firefighters may be exposed to these potentially harmful chemicals in an enclosed space. In order to address this problem, the storage compartment for the SCBA is sealed from the cabin of the firetruck and is accessed from the exterior of the firetruck. More specifically, the storage compartment is walled off from the cabin interior and has its own door panel that opens from outside the firetruck. In this way, any chemicals that off-gas from the SCBA are contained in their own compartment separate from the interior of the cabin.

Additionally, the storage compartment includes a deployment mechanism to facilitate efficient and ergonomic donning of the SCBA. Various embodiments of the deployment mechanism are disclosed herein, and all are configured to deploy the SCBA from an elevated position, e.g., above the wheel well of the firetruck, to a position that is roughly at the level of a firefighter's back. Thus, the various deployment mechanisms include extender arms, slidable tracks, hinges, dropdown mechanisms, etc. to transition the SCBA from inside the storage compartment to a position outside the storage compartment and at a height that makes them ergonomically accessible. In certain embodiments, the deployment mechanisms are mechanized so that, upon opening the door panel or, e.g., pressing a button, the deployment mechanism will cause the SCBA to automatically deploy. In other embodiments, the deployment mechanism is manually deployed. Further, embodiments are partially mechanized and partially manual, e.g., lifting operations are mechanized whereas sliding operations are manual.

In one aspect, the invention provides a storage compartment on a firetruck for SCBA. The storage compartment includes a mount configured to hold at least one SCBA and a deployment mechanism. The deployment mechanism is configured to transition the mount from a first vertical position on an interior of the storage compartment to a second vertical position on an exterior of the storage compartment. Further, the second vertical position is lower than the first vertical position.

In another aspect, the invention provides a cabin body of a firetruck. The cabin body includes at least one occupant section and at least one storage compartment. Each of the at least one storage compartment has a mount configured to hold at least one SCBA and a deployment mechanism. The deployment mechanism is configured to transition the mount from a first vertical position on an interior of the storage compartment to a second vertical position lower than the first vertical position on an exterior of the storage compartment. Further, the at least one storage compartment is closed off from the at least one occupant section.

In yet another aspect, the invention provides a method of deploying a mount for SCBA on a firetruck from a storage compartment. In the method, the mount is moved from the interior of the storage compartment to an exterior of the storage compartment. Further, the mount is lowered from a first vertical position to a second vertical position that is from 3.5' to 5' off the ground.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 8 depicts still another deployment mechanism, according to an exemplary embodiment;

FIG. 9 depicts a side view of a rotatable deployment version of the deployment mechanism of FIG. 8;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of a storage compartment for self-contained breathing apparatuses (SCBA) are provided. The storage compartment includes a deployment mechanism to facilitate efficient and ergonomic donning of the SCBA. Advantageously, the storage compartment is sealed from the cabin of a firetruck and is accessed from the exterior of the firetruck so that any chemicals that off-gas from the SCBA are contained in their own compartment separate from the interior of the firetruck's cabin. As will be discussed more fully below, the SCBA are able to be deployed from the storage compartment in a variety of different ways. Each embodiment of the deployment mechanism is configured to deploy the SCBA from an elevated position within the storage compartment to an ergonomic exterior position that is roughly at the level of a firefighter's back (e.g., roughly 3.5' to 5' off the ground) so that the firefighter does not have to stoop or bend in order to don the SCBA. The embodiments of the storage compartment and the deployment mechanism presented herein are exemplary in nature and not to be construed as limiting.

Figure 1:
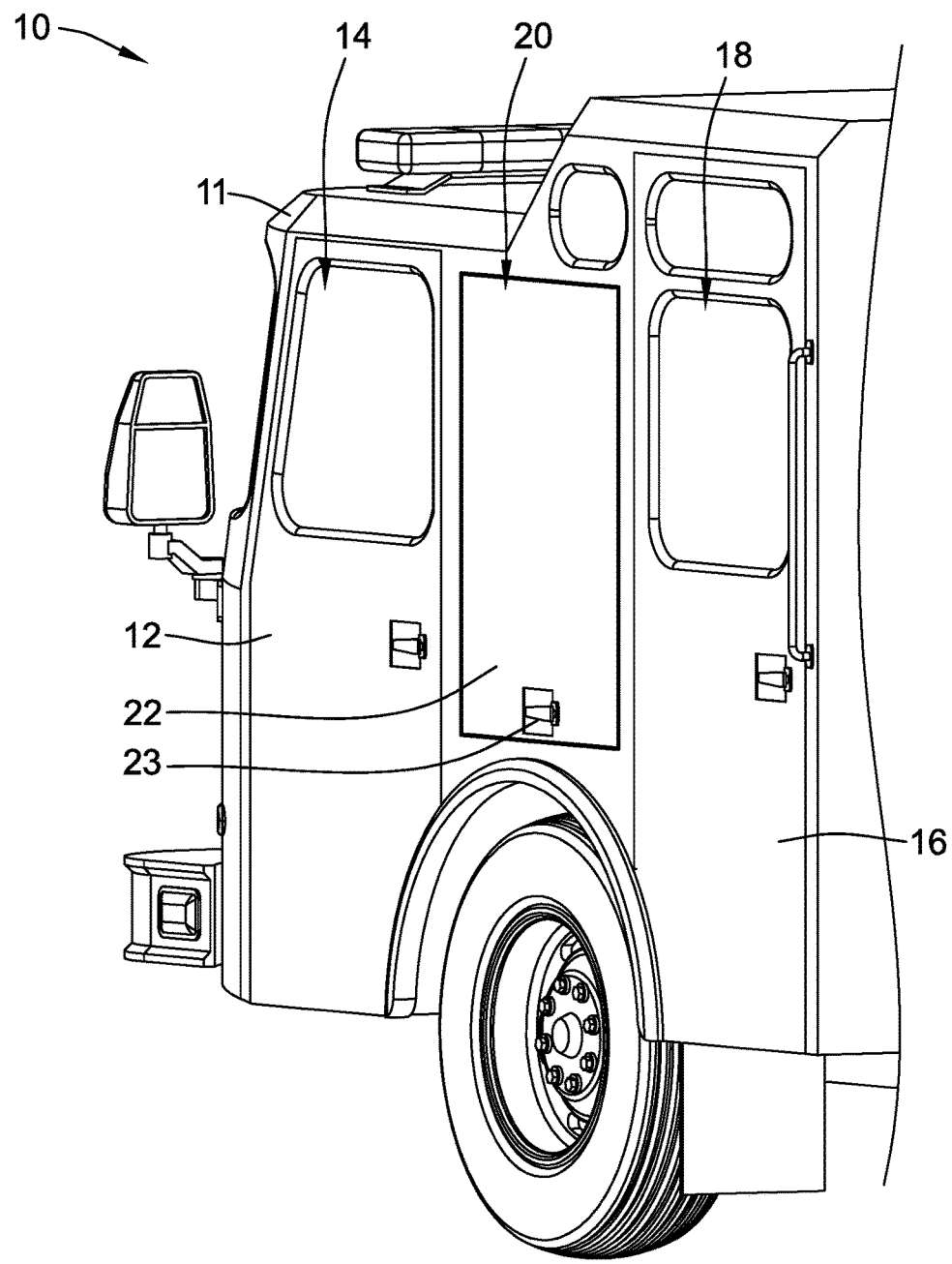
FIG. 1 is a perspective view of a passenger cabin of a firetruck having a compartment for the storage of self-contained breathing apparatuses (SCBA), according to an exemplary embodiment.

Referring to FIG. 1, a partial perspective view of a front end of firetruck 10 is depicted. The firetruck 10 includes a cabin body 11 having a front driver side door 12 opening into a front occupant section 14 where, e.g., a driver and a passenger sit. In the embodiment depicted, the cabin body 11 also includes a rear driver side door 16 that opens into a rear occupant section 18, where additional passengers sit. While not depicted, the passenger side of the firetruck also includes a front and rear door in embodiments.

In the embodiment of FIG. 1, an SCBA storage compartment 20 is provided between the front occupant section 14 and the rear occupant section 18. More specifically, the SCBA storage compartment 20 is located in an elevated position over the wheel well 21. In conventional firetrucks, the region of the cabin body over the wheel well tends to be lightly utilized dead space in the cabin body interior because the wheel well takes up what might otherwise be used for passenger space. The SCBA storage compartment 20 includes a front panel 22 with an access feature, which, in the embodiment depicted, is a handle 23.

Figure 2:
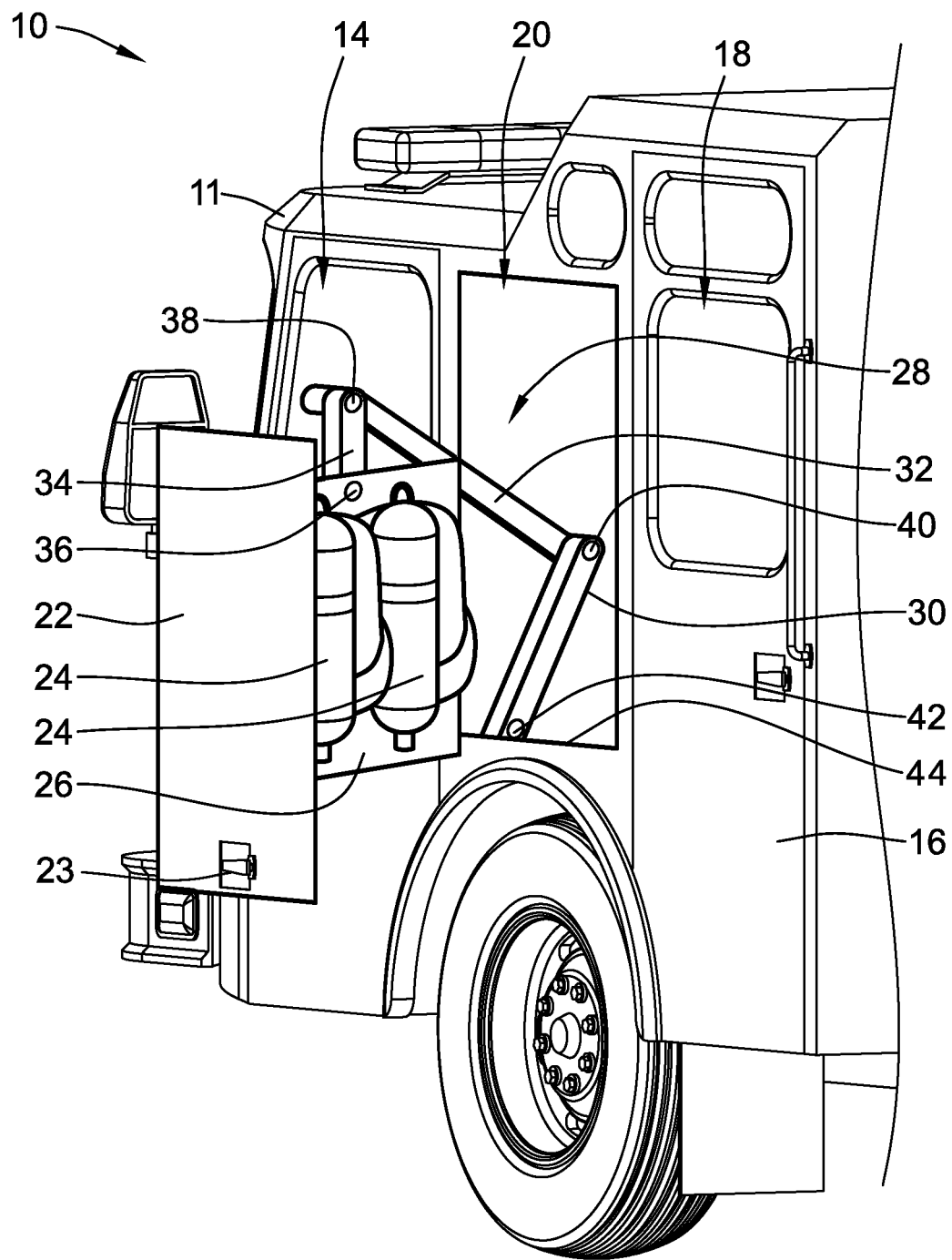
FIG. 2 depicts the firetruck of FIG. 1 in which the compartment is opened and the SCBA are partially deployed by a deployment mechanism, according to an exemplary embodiment.

As can be seen in FIG. 2, the SCBA storage compartment 20 is configured to store one or more SCBA 24. In the embodiment depicted, the number of SCBA 24 is two. The SCBA 24 are held on a mount 26 that is connected to a deployment mechanism 28. In the embodiment shown in FIG. 2, the deployment mechanism 28 is an articulated arm having a first arm section 30, a second arm section 32, and a third arm section 34. The third arm section 34 is connected to the mount 26 via a pivot attachment 36. In this way, the mount 26 is able to rotate about the pivot attachment 36 during deployment and retraction of the SCBA 24. The third arm 34 and the second arm 32 are connected at a first hinge joint 38, and the second arm 32 and the first arm 30 are connected at a second hinge joint 40. Further, a third hinge joint 42 connects the first arm 30 to a floor 44 of the storage compartment. In embodiments, each of the first hinge joint 38, the second hinge joint 40, and the third hinge joint 42 includes a stop to limit the rotation about the respective hinge 38, 40, 42 such that approximately right angles are formed between the arms 30, 32, 34 in the stored and deployed configurations.

Figure 3:
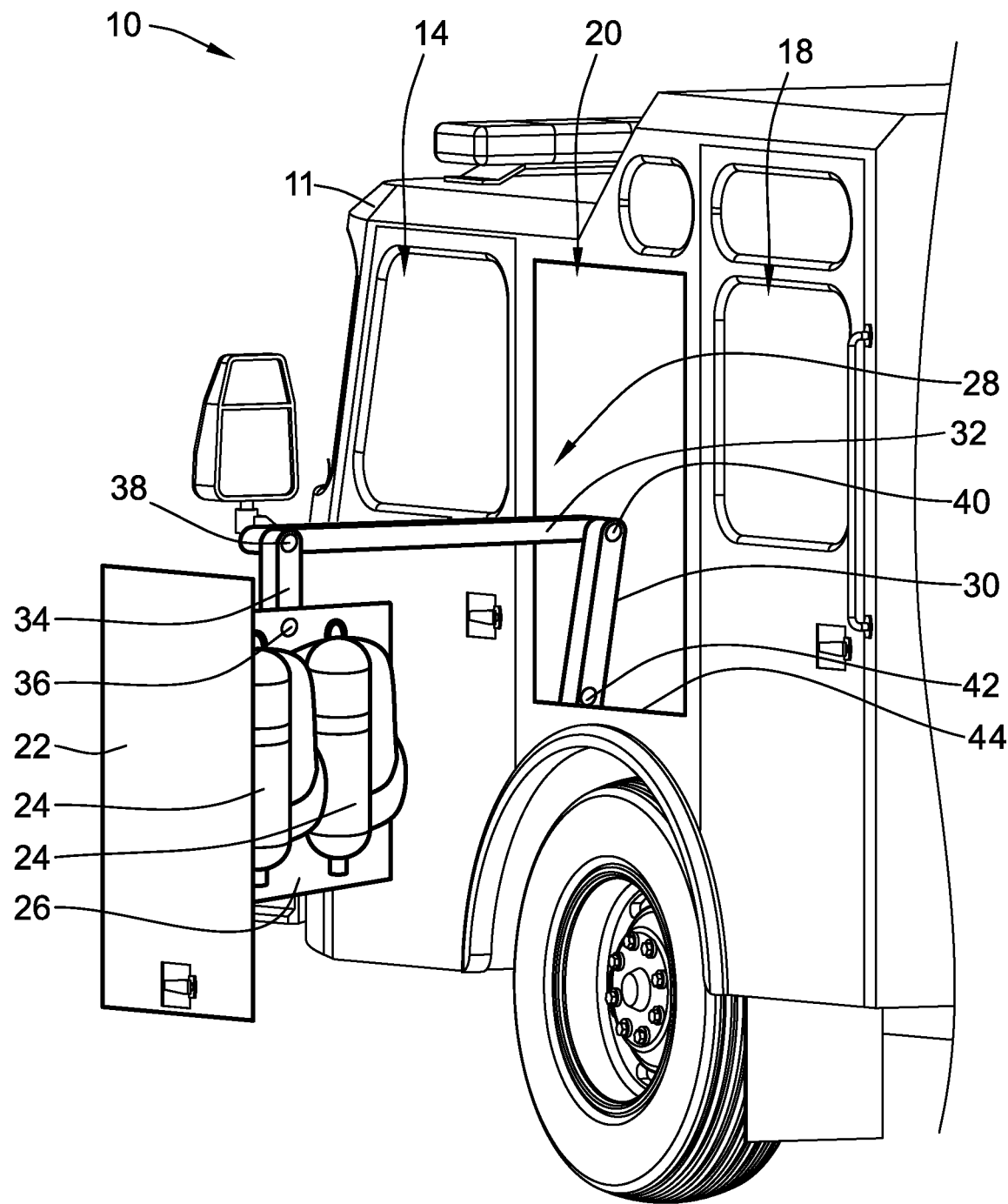
FIG. 3 depicts the deployment mechanism of FIG. 2 in which the SCBA are fully deployed.

FIG. 3 depicts the deployment mechanism 28 in the fully deployed position. As can be seen, the first arm 30 creates approximately a right angle with the floor 44 of the SCBA storage compartment 20; the second arm 32 creates approximately a right angle with the first arm 30; and the third arm 34 creates approximately a right angle with the second arm 32. Further, in going from the stored configuration to the deployed configuration, the first arm 30 and the third arm 34 transition from a horizontal arrangement to a vertical arrangement. Conversely, the second arm 32 transitions from a vertical arrangement in the stored configuration to a horizontal arrangement in the deployed configuration. In transitioning from the stored configuration to the deployed configuration, the deployment mechanism 28 not only moves the mount 26 to the exterior of the SCBA storage compartment 20 but also drops the mount 26 down from its elevated position above the wheel well 21. In order to provide a controlled deployment, dashpots and/or springs are used in embodiments to dampen or assist movement of the arm sections 30, 32, 34 in relation to each other.

Figure 4:
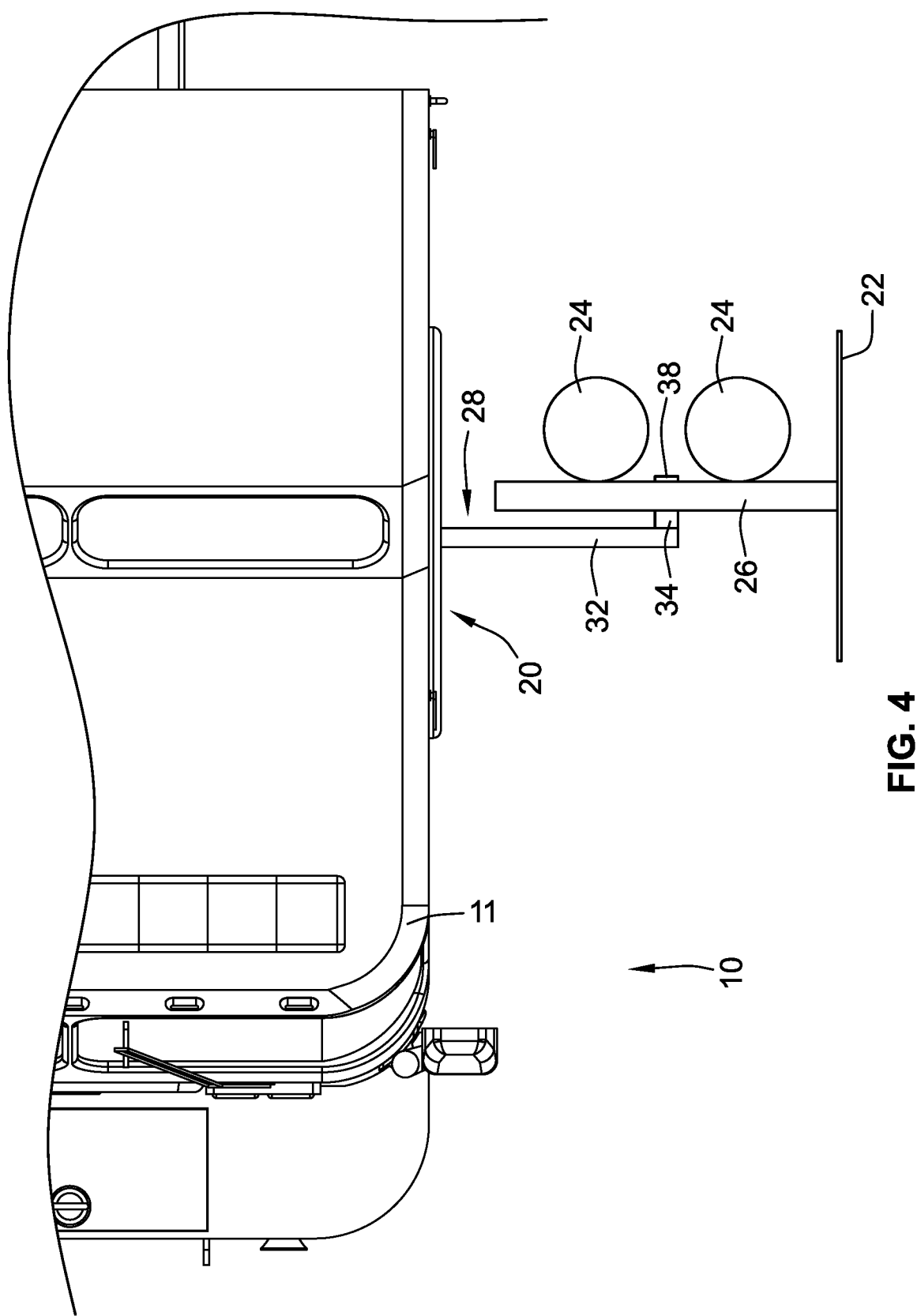
FIG. 4 is a top view of the deployment mechanism of FIGS. 2 and 3 in which the SCBA are fully deployed.

FIG. 4 depicts a top view of the deployment mechanism 28. As can be seen, SCBA 24 are mounted on a first side of the mount 26, and the deployment mechanism 28 is mounted to a second side of the mount 26. In this stacked arrangement, the articulated arm deployment mechanism 28 folds behind the mount 26 during storage and avoids contact with the SCBA 24. However, in other embodiments, the deployment mechanism 28 is wrapped around the outer periphery of the mount 26 and/or is connected to the first side of the mount 26 with the SCBA 24. Additionally, while only the driver side of the cabin body 11 is depicted in the figures, an SCBA storage compartment is provided on the passenger side of the cabin body as well in embodiments.

Figure 5:
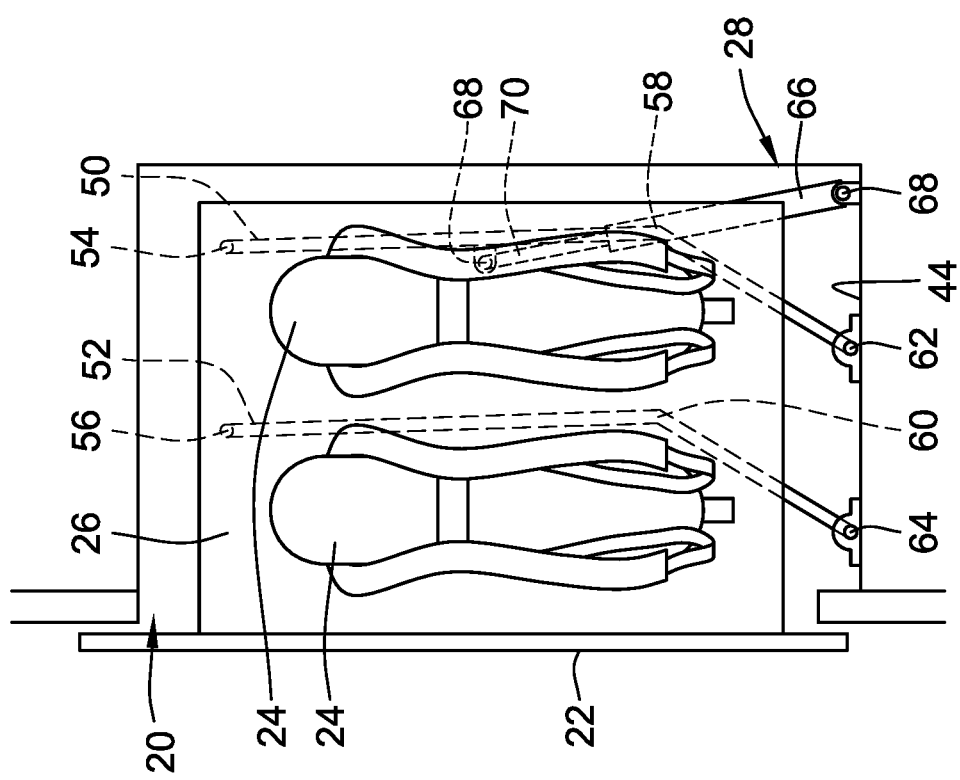
FIG. 5 depicts another deployment mechanism in the storage configuration, according to an exemplary embodiment.

FIG. 5 depicts another embodiment of a deployment mechanism 28. As can be seen in FIG. 5, the deployment mechanism includes a first arm 50 and a second arm 52. The first arm 50 is connected to a first side of the mount 26 (opposite the SCBA 24) with a first pivot attachment 54, and the second arm 50 is connected to the first side of the mount 26 with a second pivot attachment 56. In an embodiment, the first arm 50 and the second arm 52 each have a respective bend 58, 60 located along their respective lengths. The first arm 50 is attached to the floor 44 of the SCBA storage compartment 20 with a first hinge 62, and the second arm 52 is attached to the floor 44 of the SCBA storage compartment 20 with a second hinge 64. An actuator 66 is connected at a first end to the floor 44 via a third hinge 68 and at a second end to the first arm 52 via a third pivot attachment 70. The actuator 66 includes an actuation arm 72.

Figure 6:
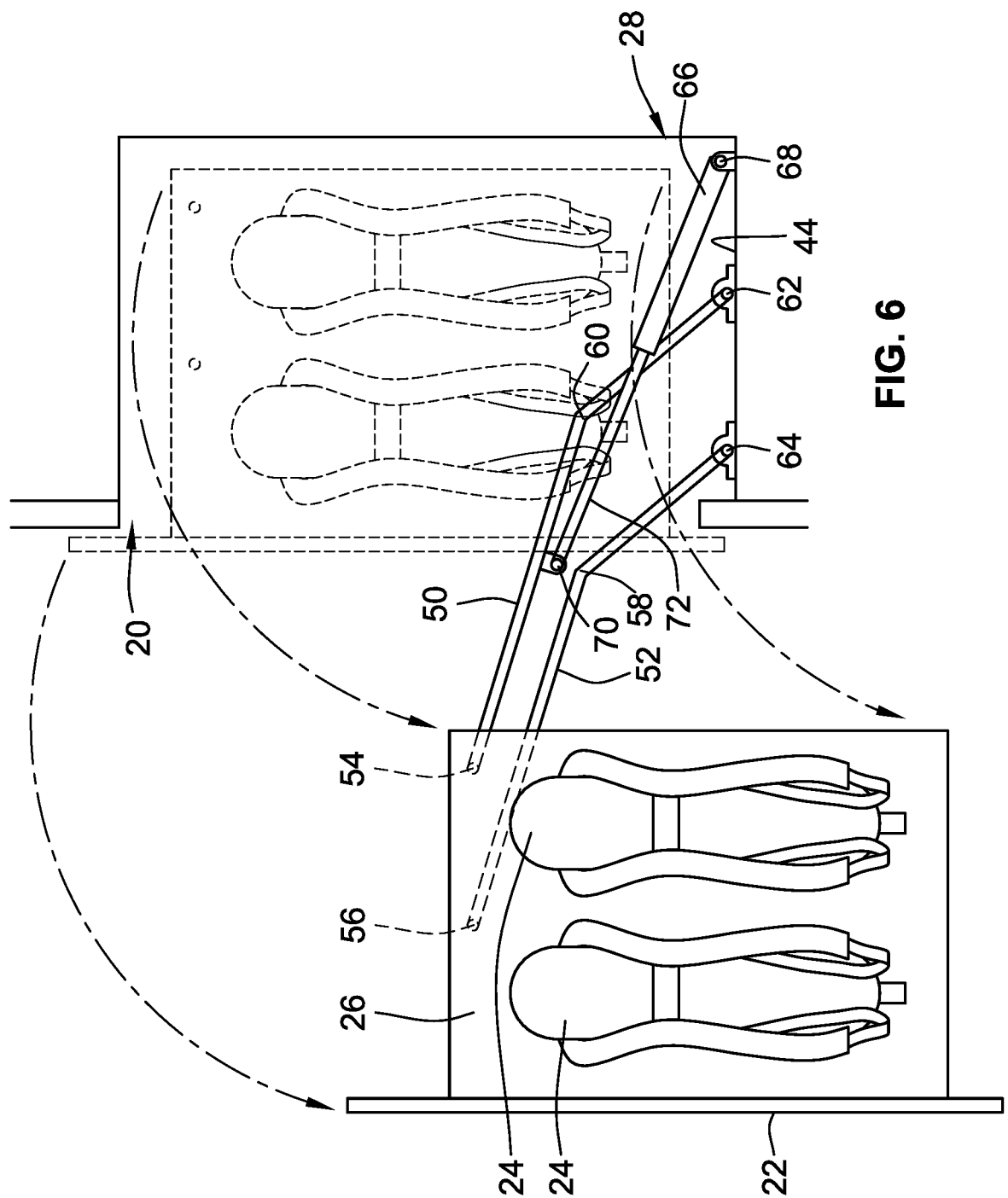
FIG. 6 depicts the deployment mechanism of FIG. 5 in the fully deployed configuration.

The actuator 66 drives extension of the actuation arm 72, which causes the first arm 52 to rotate about the first hinge 62, and because the first arm 52 is attached to the mount 26, the second arm 54 will also rotate about the second hinge 64 in response to actuation of the actuator 66. In embodiments, only a single arm 50 is used to move the mount 26; although, using two arms 50, 52 helps to level and support the weight of the mount 26, especially when holding the SCBA 24. During deployment, the mount 26 will initially rise, which facilitates lifting the mount 26 and SCBA 24 out of the SCBA storage compartment 20. Further, as can be seen in FIG. 6, the bends 58, 60 in the first and second arms 50, 52 also allow for the mount 26 to be dropped a further amount than if the arms 50, 52 were straight. In order to put the mount 26 back into the storage configuration, the actuator 66 just retracts the actuation arm 72, which causes the first and second arms 50, 52 to rotate back into the SCBA storage compartment 20.

In embodiments, the actuator 66 is a linear electric actuator. However, in other embodiments, the actuator is a hydraulic or pneumatic actuator. Further, in embodiments, the actuator 66 can be replaced with a dashpot and/or a spring to provide manual operation such that the dashpot dampens the movement and the spring assists retraction.

Figure 7:
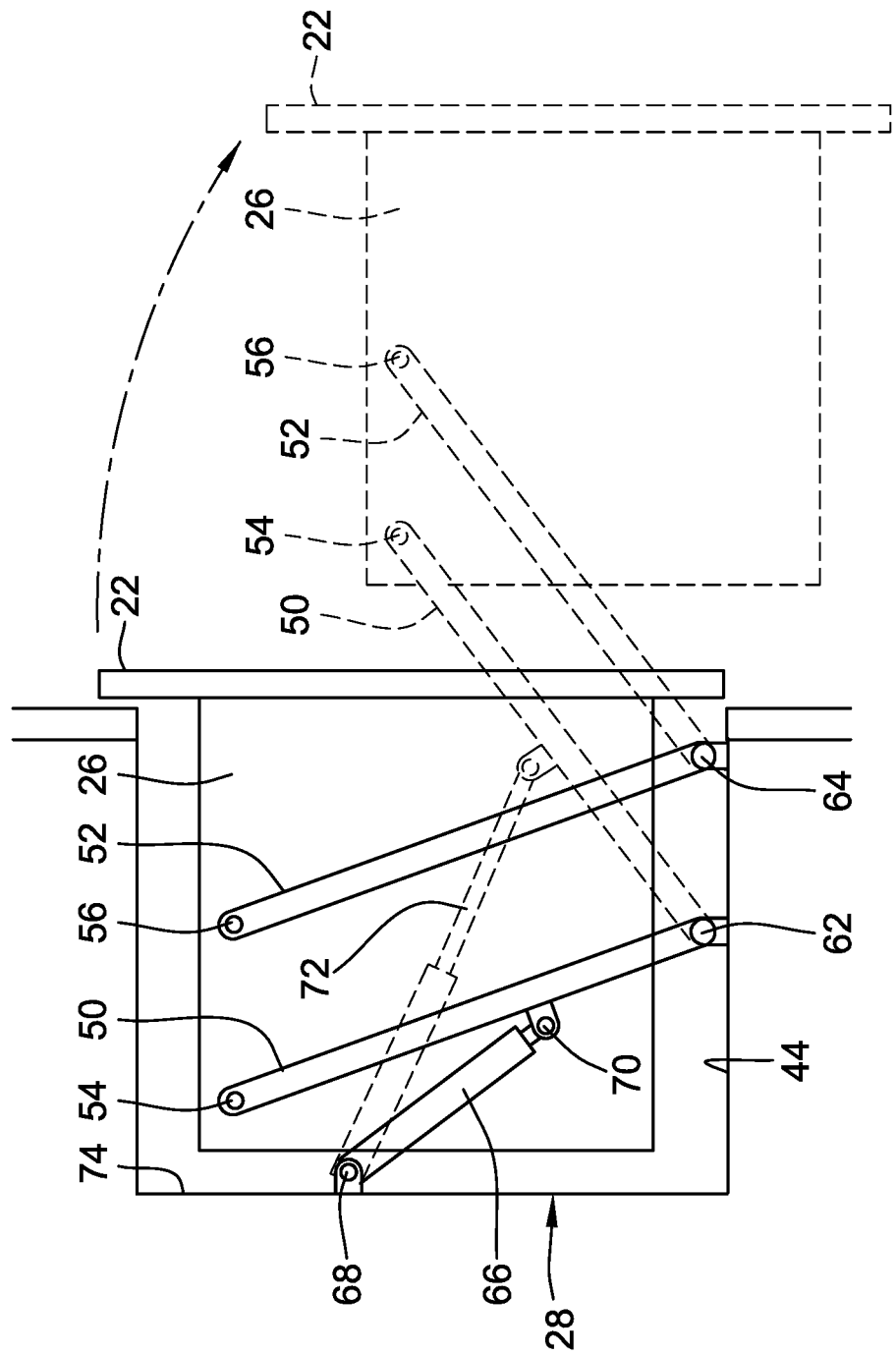
FIG. 7 depicts a further deployment mechanism, according to an exemplary embodiment.

FIG. 7 depicts an alternate embodiment of the deployment mechanism 28 in which the first arm 50 and the second arm 52 are straight. As can be seen, the first arm 50 and the second arm 52 are still attached to the floor 44 of the SCBA storage compartment 20 via the first hinge 62 and the second hinge 64, respectively, and the first arm 50 and the second arm 52 are attached to the mount 26 by the first pivot attachment 54 and the second pivot attachment 56. In this embodiment, though, the actuator 66 is mounted to a sidewall 74 of the SCBA storage compartment 20 via the third hinge 68 and attached to the third pivot attachment 70 of the first arm 50. When the actuator 66 drives extension of the actuator arm 70, the first arm 50, second arm 52, and mount 26 rotate out of the SCBA storage compartment 20 and drop to a lower vertical position. To retract the mount 26, the actuator 66 retracts the actuator arm 70, rotating the mount 26 back into the SCBA storage compartment 20. As with the previous embodiment, a single arm 50 is used in embodiments, but using two arms 50, 52 helps to level and support the weight of the mount 26, especially when holding the SCBA 24.

FIG. 8 provides still another embodiment of the deployment mechanism 28 in which the mount 26 is connected to a first slidable extension track 76 and a second slidable extension track 78. On a lateral wall 80 of the SCBA storage compartment 20 are a first slide mount 82 of the first slidable extension track 76 and a second slide mount 84 of the second slidable extension track 78. The first slide mount 82 has a first extender arm 86 and a second extender arm 88, and the second slide mount 84 has a first extender arm 90 and a second extender arm 92. In the first slidable extension track 76, the first extender arm 86 slidably extends from and retracts into slide mount 82, and the second extender arm 88 slidably extends from and retracts into the first extender arm 86. Similarly, in the second slidable extension track 76, the first extender arm 90 slidably extends from and retracts into the second slide mount 84, and the second extender arm 92 slidably extends from and retracts into the first extender arm 90. Using the slidable extension tracks 76, 78, the mount 26 is able to be extended laterally from the SCBA compartment 20. As described below, various embodiments of deployment mechanisms shown in FIGS. 9, 10, and 11 are provided to allow for the vertical displacement down to an ergonomic height.

For instance, in the embodiment shown in FIG. 9, the second extender arms 88, 92 connect to a backplate 93. The backplate 93 is hingably attached to a first end of a linkage bar 94 via a first hinge 96. The linkage bar 94 is also hingably connected to the mount 26 via a second hinge 98 at a second end. Using this deployment mechanism 28, the first slidable extension track 76 and the second slidable extension track 78 (as shown in FIG. 8) are extended such that the mount 26 is moved from the interior of the SCBA storage compartment 20 to the exterior. Then, the linkage bar 94 is rotated clockwise (with respect to the orientation shown in FIG. 9) while the mount 26 is rotated counterclockwise. In this way, the mount 26 vertically drops to a lower, ergonomic position. In embodiments, stops are provided on the hinges 96, 98 to stop rotation of the linkage bar 94 and the mount 26 at particular angles relative to the backplate 93 and linkage bar 94, respectively.

Figure 11:
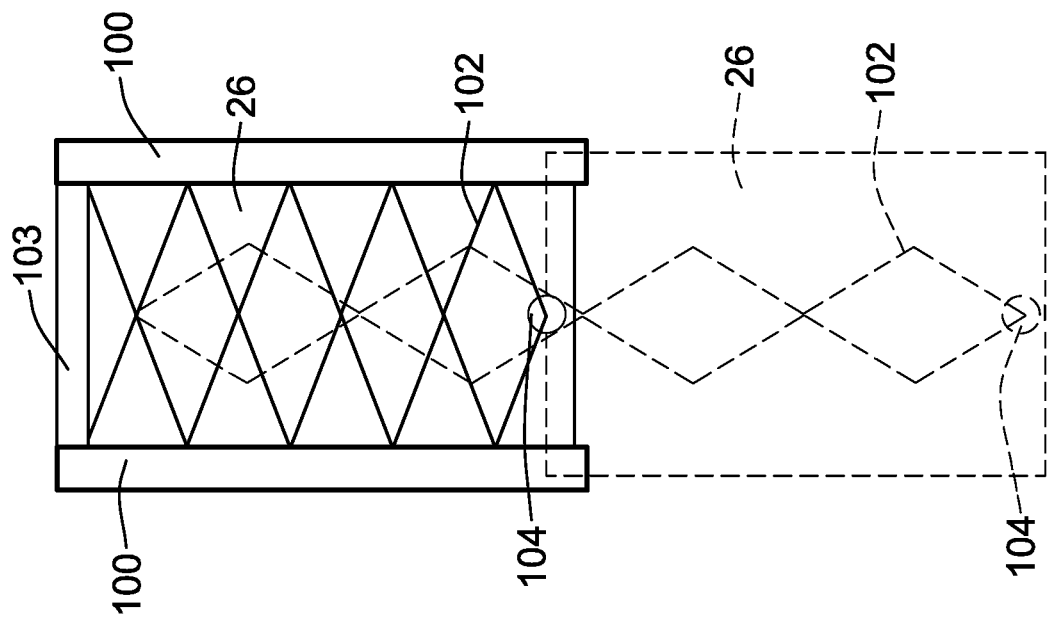
FIG. 11 depicts a rear view of the dropdown deployment version of FIG. 10.
Figure 10:
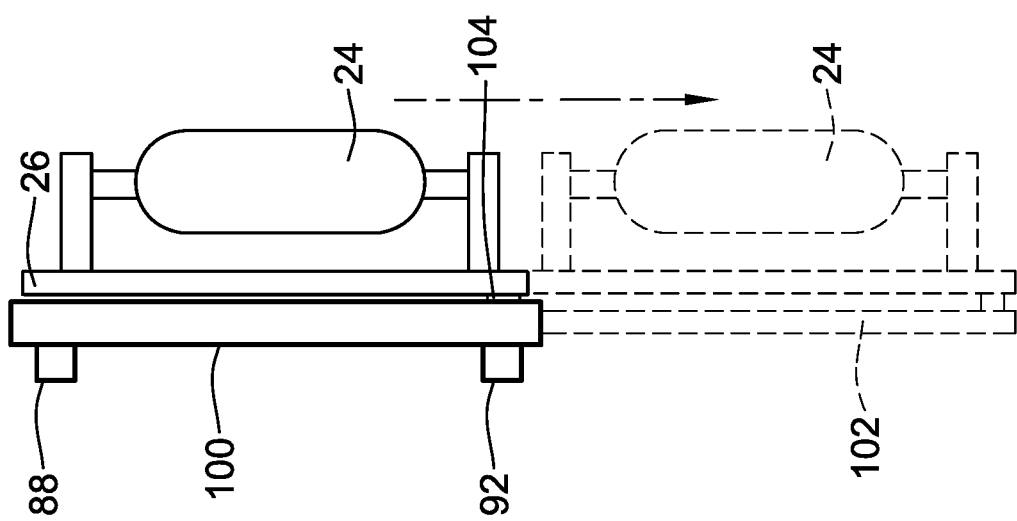
FIG. 10 depicts a side view of a dropdown deployment version of the deployment mechanism of FIG. 8.

Another exemplary embodiment of a deployment mechanism usable with the slidable extension tracks 76, 78 of FIG. 8 is shown in FIGS. 10 and 11. In the embodiment shown in FIG. 10, the second extender arms 88, 92 are connected to a drop down sleeve 100. As shown in the rear-view of FIG. 11 (in which extender arms 88 and 92 are not depicted to provide greater clarity), a scissor extender arm 102 is contained within the sleeve 100. A first, upper end of the scissor extender arm 102 is connected to the drop down sleeve 100 or to a top bar 103 of the drop down sleeve 100, and a second, lower end of the scissor extender arm 102 is connected to the mount 26 at attachment point 104. In the embodiment depicted, the attachment point 104 is located towards the lower end of the mount 26, but in other embodiments, the attachment point 104 is located in a central region of the mount 26 or at the top of the mount 26. In the stored configuration, the scissor extender arm 102 is retracted within the sleeve 100, and in the deployed configuration, the scissor extender arm 102 extends at least partially out the sleeve 100 so as to lower the vertical position of the mount 26 to an ergonomic height. In embodiments, the scissor extender arm 102 includes locking joints to hold the scissor extender arm 102 in the extended or retracted position. Further, in embodiments, a catch mechanism (not shown) is provided to hold the scissor extender arm 102 in the retracted position, such that, upon release of the catch mechanism, the scissor extender arm 102 drops downwardly under the influence of gravity. In certain exemplary embodiments, segments of the scissor extender arm 102 are provided with extension springs to control the descent of the mount 26 during deployment.

Figure 12:
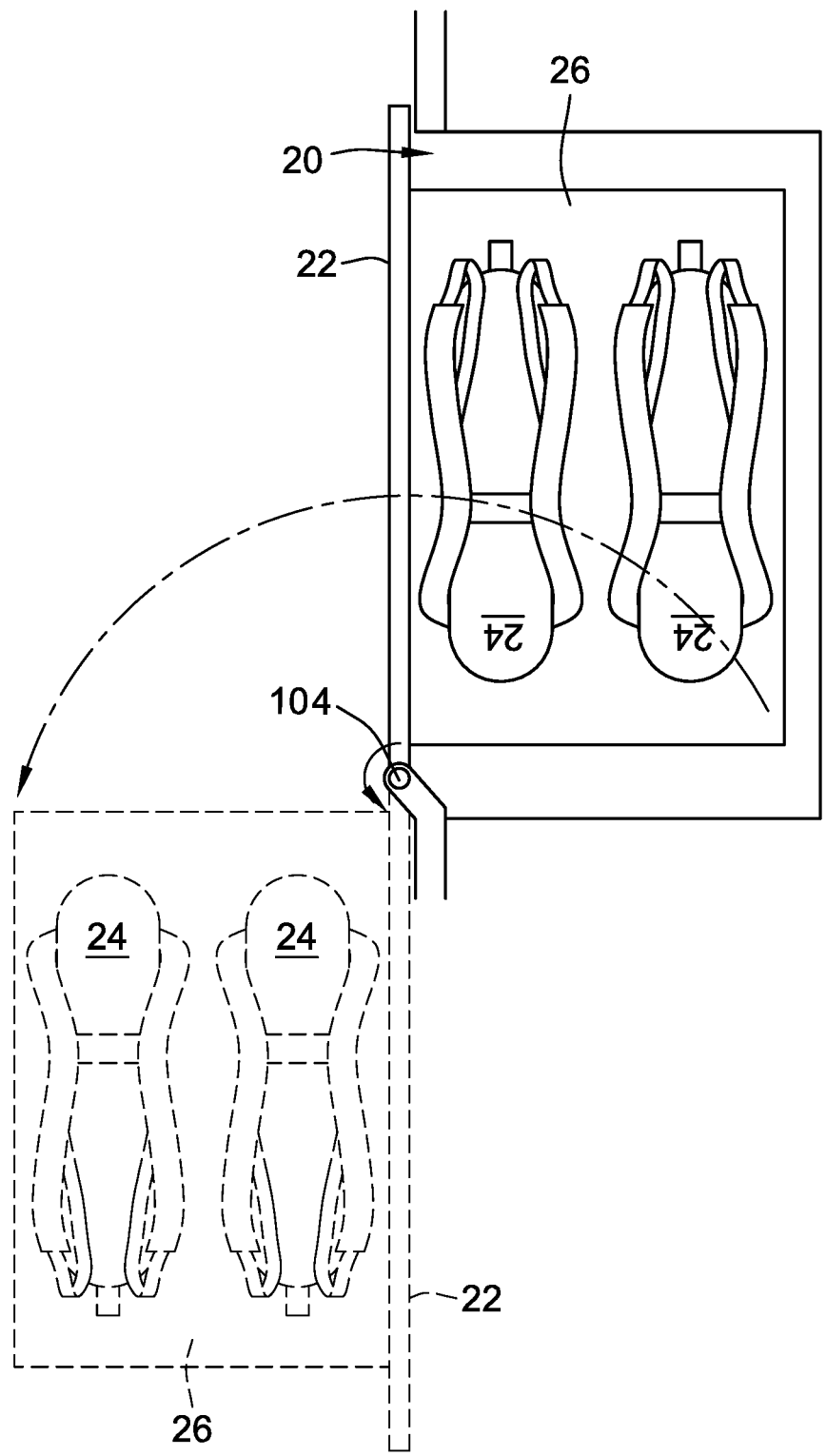
FIG. 12 depicts yet another deployment mechanism, according to an exemplary embodiment.

Referring now to still another embodiment shown in FIG. 12, the door panel 22 is attached to the cabin body 11 at a hinge 104. In the SCBA storage compartment 20, the mount 26 holds the SCBA 24 upside-down. When opening the door panel 22, the mount 26 rotates (with the door panel 22) about the hinge 104 so that the mount 26 moves to the exterior of the SCBA storage compartment 20 and the SCBA 24 are rotated to right-side-up.

Figure 13:
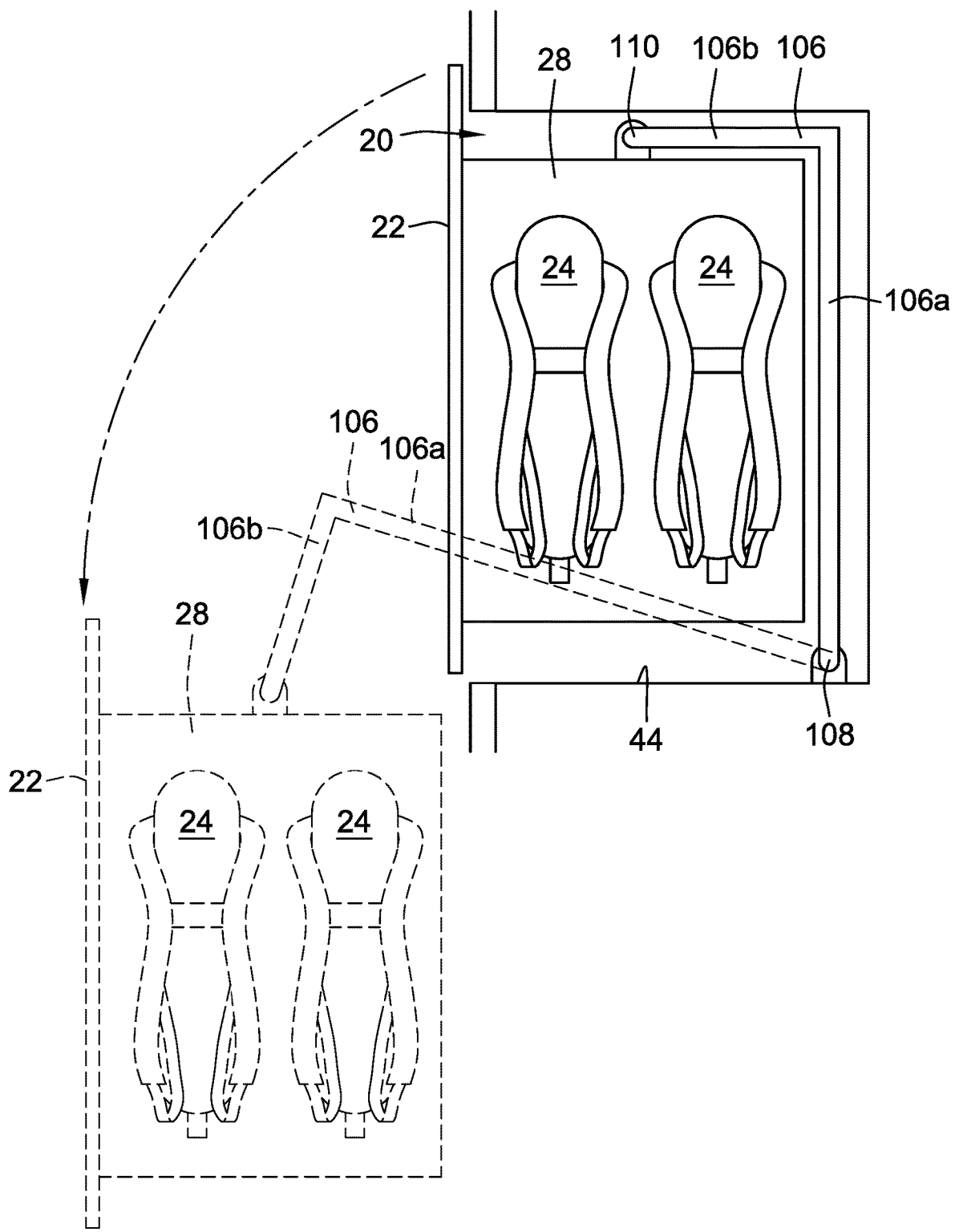
FIG. 13 depicts still yet another deployment mechanism, according to an exemplary embodiment.

In yet another embodiment shown in FIG. 13, the mount 26 is attached to an L-shaped arm 106 having a long component 106a and a short component 106b. At one end, the long component 106a of the L-shaped arm 106 is connected to the floor 44 of the SCBA storage compartment 20 via a hinge 108. At the other end, the short component 106b of the L-shaped arm 106 is connected to the mount 26 at a pivot attachment 110. In order to deploy the mount 26, the door panel 22 is pulled outwardly, causing the L-shaped arm 106 to rotate downwardly about the hinge 108. The long component 106a of the L-shaped arm 106 transitions from a vertical arrangement to a horizontal arrangement, such that the long component 106a rests against the floor 44 of the SCBA storage compartment 20 in the fully deployed configuration. The short component 106b of the L-shaped arm 106 transitions from a horizontal arrangement in the stored configuration to a vertical arrangement in the deployed configuration. In this way, the L-shaped arm 106 moves the mount 26 to the exterior of the SCBA storage compartment 20 and drops the mount 26 down in vertical position.

Figure 14:
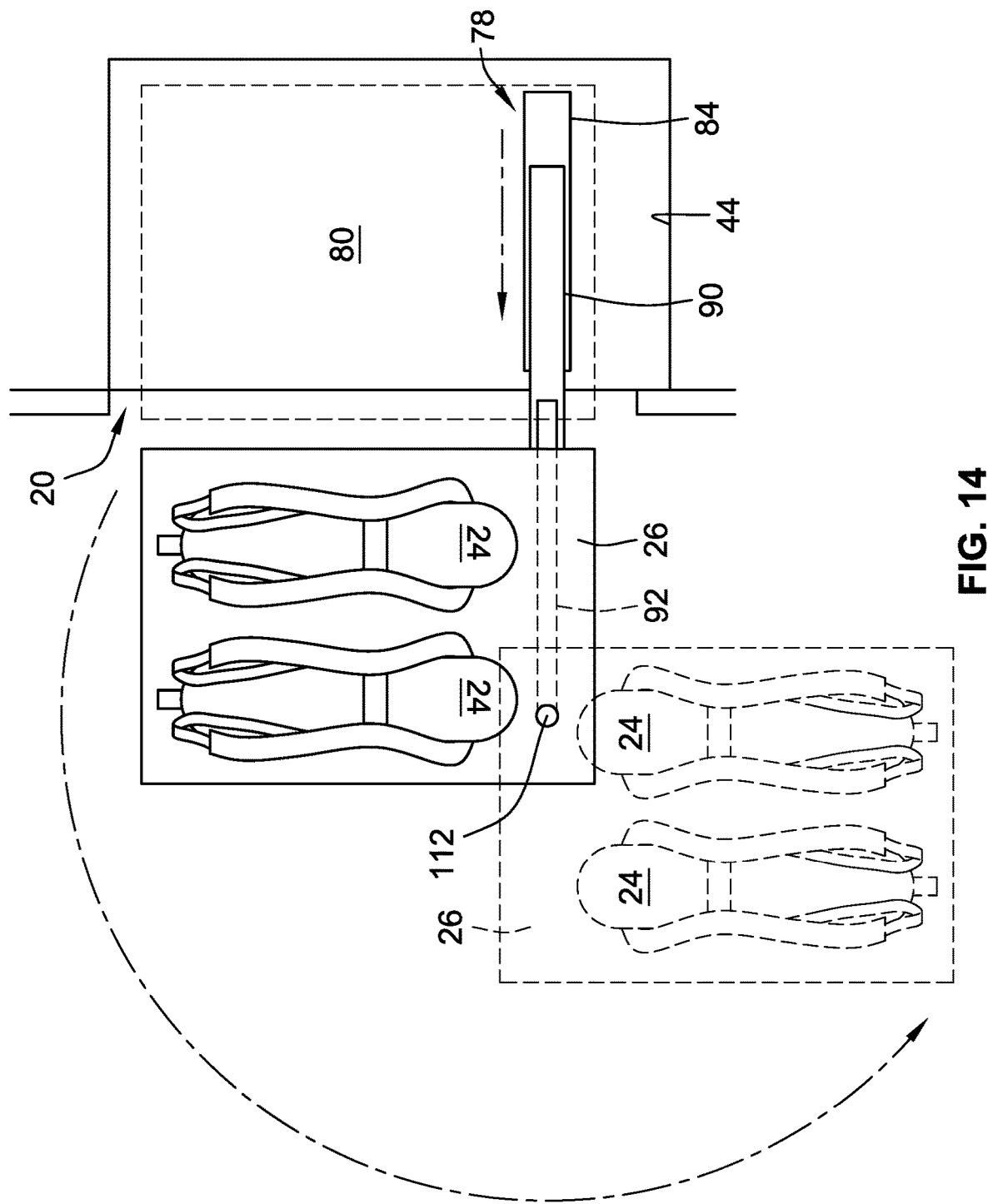
FIG. 14 depicts still a further deployment mechanism, according to an exemplary embodiment.

FIG. 14 depicts still yet another embodiment of a deployment mechanism in which a single slidable extension track 78. The single slidable extension track 78 includes a track mount 84 attached to a lateral wall 80 of the SCBA storage compartment 20, a first extender arm 90, and a second extender arm 92. The mount 26 is connected to the second extender arm 92 of the slidable extension track 78 at least at a pivot attachment 112. The mount 26 is stored in the SCBA storage compartment 20 with the SCBA 24 positioned upside-down. Upon opening the SCBA storage compartment 20, the slidable extension track 78 is extended outwardly, and the mount 26 is rotated counterclockwise (with respect to the depiction in FIG. 14) about the pivot attachment 112. This drops the mount to a lower vertical position and flips the SCBA 24 right-side-up.

Figure 15:
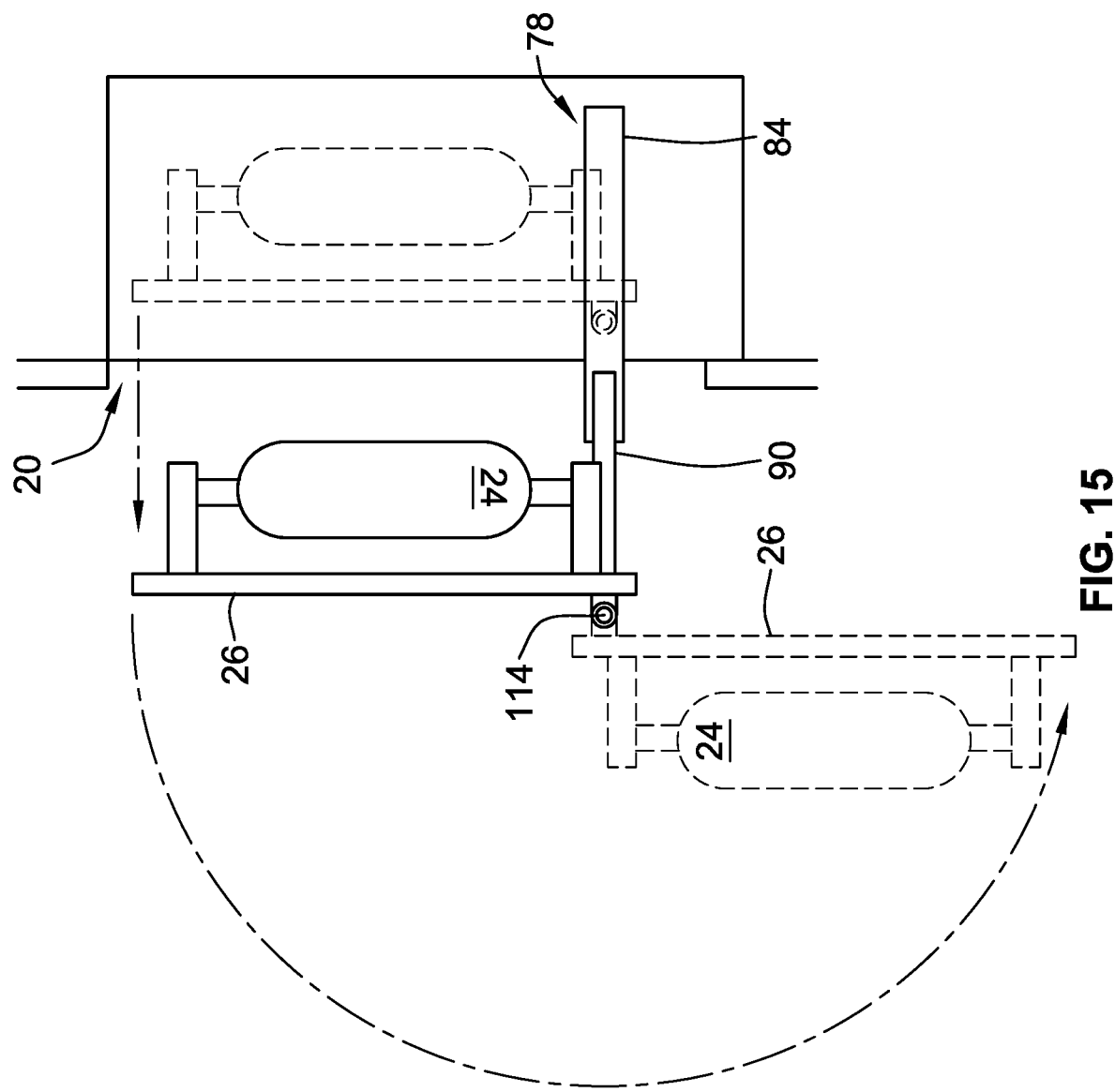
FIG. 15 depicts an alternative rotatable deployment version of the deployment mechanism of FIG. 14.

The embodiment of FIG. 15 is substantially similar to that of FIG. 14 with the exception that the mount 26 is connected to the second extender arm 92 of the slidable extension track 78 via a hinge 114. In this way, the mount 26 flips over the second extender arm 92. Thus, as with the embodiment of FIG. 14, the SCBA 24 are stored upside-down on the mount 26, and rotating about the hinge 114 also drops the mount 26 to a lower vertical position.

Figure 16:
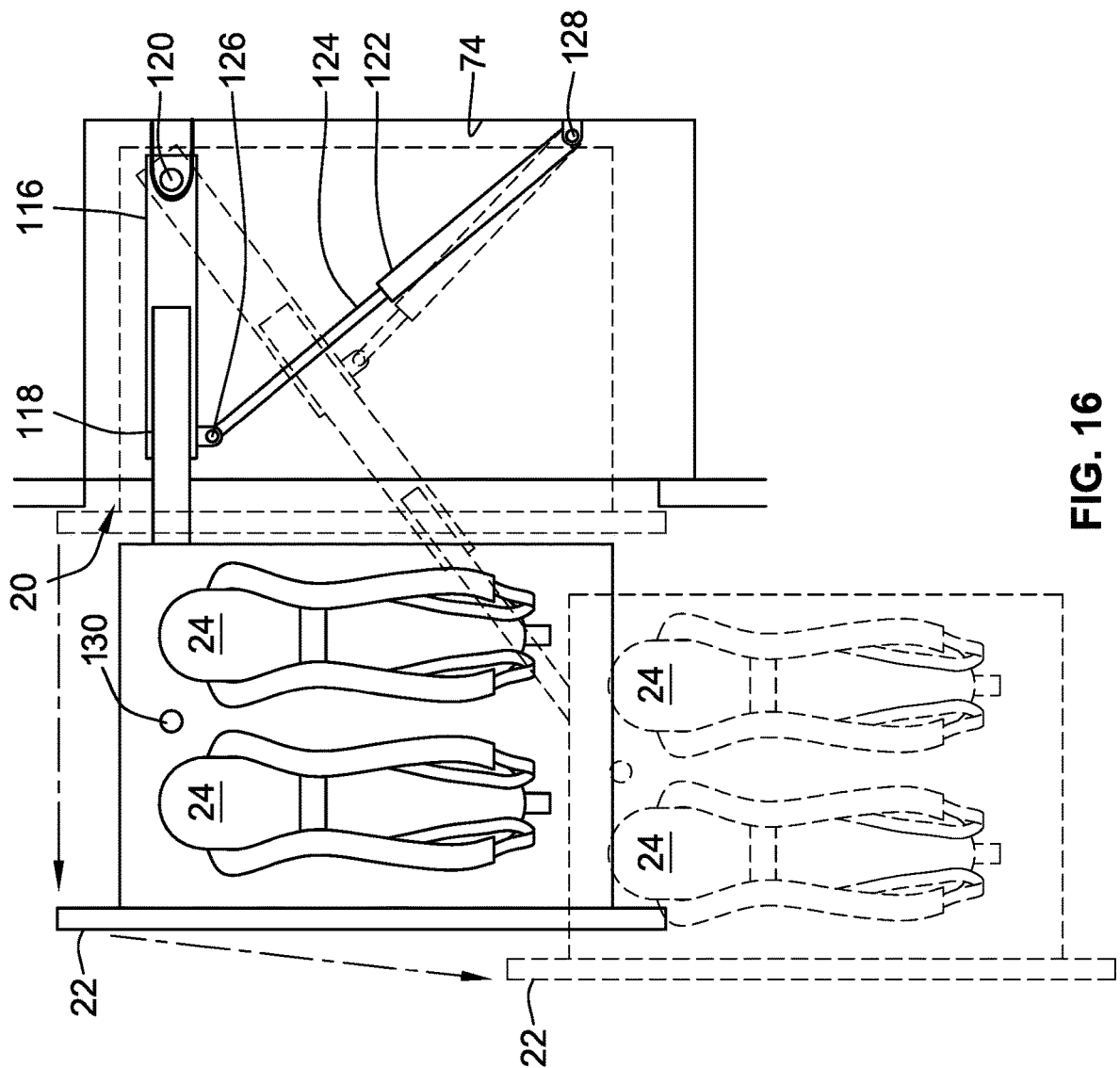
FIG. 16 depicts yet a further deployment mechanism in a partially deployed configuration, according to an exemplary embodiment.

FIG. 16 depicts still a further embodiment of the deployment mechanism 28. The mount 26 is carried on an extension arm 116 having extendable portion 118. The extension arm 116 is connected to a sidewall 74 of the SCBA storage compartment 20 via a first hinge 120. The extension arm 116 rotates about the first hinge 120 through actuation of the actuator 122, which has an actuation arm 124 connected to the extension arm 116 at a first pivot attachment 126. The actuator 122 rotates about a second hinge 128 attached to the sidewall 74 of the SCBA storage compartment 20. In the stored configuration, the actuation arm 124 is extended such that the extension arm 116 is substantially parallel with the floor 44 of the SCBA storage compartment 20.

In order to deploy the mount 26, the extendable portion 118 is extended to move the mount 26 to the exterior of the SCBA storage compartment 20 as shown in FIG. 16. Then, the actuator 122 retracts the actuation arm 124, causing the extension arm 116 to rotate downwardly about the first hinge 120. The extendable portion 118 is connected to the mount 26 via a second pivot attachment 130, which allows the mount 26 to maintain level positioning. In this way, the extension arm 116 and actuator 122 allow for deployment of the mount 26 and a lowering of the vertical position of the mount to a more ergonomic height.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A storage compartment on a firetruck for self-contained breathing apparatuses (SCBA), the storage compartment comprising:
   a panel that provides access to the storage compartment;
   a mount coupled to the panel and configured to hold at least one SCBA; and
   a deployment mechanism configured to transition the mount from a first vertical position on an interior of the storage compartment to a second vertical position on an exterior of the storage compartment;
   wherein the second vertical position is lower than the first vertical position;

wherein the panel is coupled to the mount such that the panel moves with the mount from the first vertical position to the second vertical position; and wherein the second vertical position is at an ergonomic height for donning of the at least one SCBA.

2. The storage compartment of claim 1, wherein the deployment mechanism is an articulated arm having a first arm section, a second arm section, and a third arm section;

wherein, in the first vertical position, the first arm section and the third arm section are in a substantially horizontal arrangement and the second arm section is in a substantially vertical arrangement; and wherein, in the second vertical position, the first arm section and the third arm section are in a substantially vertical arrangement and the second arm is in a substantially horizontal arrangement.

3. The storage compartment of claim 1, wherein the deployment mechanism includes at least one arm and an actuator connected to the at least one arm, the actuator configured to cause rotation of the at least one arm so as to move the mount between the first vertical position and the second vertical position.

4. The storage compartment of claim 3, wherein actuator has an actuator arm that extends to cause rotation of the at least one arm such that the mount moves from the first vertical position to the second vertical position.

5. The storage compartment of claim 3, wherein the actuator has an actuator arm that retracts to cause rotation of the at least one arm such that the mount moves from the first vertical position to the second vertical position.

6. The storage compartment of claim 1, wherein the deployment mechanism includes at least one slidable extension track having at least one extender arm connected to the mount.

7. The storage compartment of claim 1, wherein the deployment mechanism includes a hinge connecting the panel to a floor of the storage compartment, and wherein the mount rotates 180° in a plane defined by the mount moving from the first vertical position to the second vertical position.

8. The storage compartment of claim 1, wherein the deployment mechanism includes an L-shaped arm having a long component and a short component, wherein the short component is pivotably attached to the mount, wherein the long component is hingably attached to a floor of the storage compartment, wherein the long component transitions from a vertical arrangement in the first vertical position to a horizontal arrangement in the second vertical position, and wherein the short component transitions from a horizontal arrangement in the first vertical position to a vertical arrangement in the second vertical position.

9. A cabin body of a firetruck, comprising:
at least one occupant section; and
at least one storage compartment, each of the at least one storage compartment having a mount configured to hold at least one self-contained breathing apparatus (SCBA) and a deployment mechanism;
wherein the deployment mechanism is configured to transition the mount from a first vertical position on an interior of the storage compartment to a second vertical position lower than the first vertical position on an exterior of the storage compartment; and
wherein the at least one storage compartment is closed off from the at least one occupant section,
wherein the at least one occupant section comprises a front occupant section and a rear occupant section and wherein the at least one storage compartment is located between the front occupant section and the rear occupant section.

10. The cabin body of claim 9, wherein the at least one storage compartment is located above a wheel well of the firetruck.

11. The cabin body of claim 9, wherein the firetruck has a driver side and a passenger side, wherein the at least one storage compartment comprises a driver side storage compartment and a passenger side storage compartment.

12. The cabin body of claim 11, wherein each of the driver side storage compartment and the passenger side storage compartment hold at least two SCBA.

13. A firetruck comprising:
at least one occupant section; and
at least one storage compartment, each of the at least one storage compartment having a mount configured to hold at least one self-contained breathing apparatus (SCBA) and a deployment mechanism configured to transition the mount from a first vertical position on an interior of the storage compartment to a second vertical position lower than the first vertical position on an exterior of the storage compartment; and
a panel that provides access to the storage compartment, the panel coupled to the mount such that the panel moves with the mount from the first vertical position to the second vertical position;
wherein the at least one storage compartment is closed off from the at least one occupant section.

* * * * *